United States Patent [19]

Brauer et al.

[11] Patent Number: 4,535,142

[45] Date of Patent: Aug. 13, 1985

[54] HIGH SOLIDS COATINGS BASED ON DIRICINOLEATE DERIVATIVES

[75] Inventors: Melvin Brauer, East Brunswick; Dominic Simone, Lincroft, both of N.J.

[73] Assignee: CasChem, Inc., Bayonne, N.J.

[21] Appl. No.: 629,522

[22] Filed: Jul. 10, 1984

[51] Int. Cl.$^3$ ............................................. C08G 18/36
[52] U.S. Cl. ...................................... 528/75; 528/74.5
[58] Field of Search ................................. 528/74.5–75

[56] References Cited

U.S. PATENT DOCUMENTS

| | | | |
|---|---|---|---|
| 2,496,340 | 2/1950 | Earhart | 260/448.8 |
| 2,498,657 | 2/1950 | De Groote et al. | 252/342 |
| 2,534,803 | 12/1950 | Smith et al. | 252/79 |
| 2,562,218 | 7/1951 | Smith | 260/410.6 |
| 2,984,679 | 5/1961 | Ehrlich et al. | 260/404.5 |
| 3,345,311 | 10/1967 | Ehrlich et al. | 260/18 |
| 3,859,121 | 1/1975 | Yeadon et al. | 424/306 |
| 3,875,090 | 4/1975 | Levy | 524/317 |
| 3,878,112 | 4/1975 | Luck et al. | 252/10 |
| 4,170,559 | 10/1979 | Kroplinski et al. | 422/48 |
| 4,281,210 | 7/1981 | Brauer et al. | 428/375 |
| 4,340,682 | 7/1982 | Legue et al. | 524/507 |

OTHER PUBLICATIONS

Mukherjea et al., J. Am. Oil Chem. Soc., 55(9), 1978, pp. 653–656.

*Primary Examiner*—Maurice J. Welsh
*Attorney, Agent, or Firm*—Pennie & Edmonds

[57] ABSTRACT

Low viscosity, high solids polyurethane coatings compositions are prepared from a diricinoleate derivate and an isocyanate or from a diricinoleate derivative, a high viscosity polyol, and an isocyanate. Also, a method for reducing the viscosity and increasing the solids content of a polyurethane coating by adding from about 1 to 99 percent by weight of a diricinoleate derivative to a hydroxyl bearing component before reacting with an isocyanate, and a method for preparing a polyurethane coating having a low viscosity suitable for spray coating applications by reacting a diricinoleate derivative with an isocyanate.

23 Claims, No Drawings

HIGH SOLIDS COATINGS BASED ON DIRICINOLEATE DERIVATIVES

TECHNICAL FIELD

The invention relates to the use of diricinoleate derivatives as components for high solids coatings, and specifically to the use of diricinoleate derivatives alone or blended with other high viscosity polyols, and then reacted with polyisocyanates with, for certain situations, small amounts of appropriate solvents to yield high solids polyurethane coatings having sprayable viscosities.

BACKGROUND ART

One of the more important commercial fields for polyurethanes is that of coating applications. Early in the development of polyurethane products, it was recognized that they could be used as lacquers; in fact, it was thought that they might extend the areas in which lacquers were used. Thus, coatings upon such substrates such as metals, plastic, paper, textiles, leather, etc. were made possible.

The resulting films exhibited extraordinary adhesiveness, high gloss, good water and solvent resistance, excellent electrical properties, low gas permeability, and good weathering resistance. Also, they could be prepared in various degrees of flexibility and under a wide range of varying temperature conditions. At present, industrial finishes utilizing polyurethane coatings are important because it is possible to take advantage of the inherent flexibility of the polyurethane along with these desirable characteristics in one high performance coating.

Any polyhydroxyl material can be reacted with a diisocyanate bearing component to produce a polyurethane, and the variety of coatings available from these two components is extensive. These two component systems have varying pot lives and could be sprayed on surfaces and allowed to air dry at ambient temperatures or applied and baked at temperatures up to 150° C. Properties such as flexibility and hardness can be varied by the selection of the polyhydroxyl material.

Typically, hydroxyl terminated polyesters with or without additional hydroxyl groups along the polymer chain, hydroxyl terminated polyethers, copolymers of hydroxyl functional acrylates and methacrylates with acrylate and methacrylate esters and styrene, copolymers of allyl alcohol, and other unsaturated monomers such as styrene and hydroxyl containing alkyd resins all have been used as the polyhydroxyl component of such polyurethane coatings. These hydroxyl terminated polymers and copolymers all are high viscosity resins, however, and they require considerable amounts of solvent to reduce their viscosity to the sprayable value of about 25-30 seconds (number 2 Zahn cup) at room temperature.

One way of reducing the viscosity of these high viscosity resins would be to mix them with hydroxyl terminated polyethers, especially those with low molecular weights. However, these low molecular weight polyethers are not suitable for coating applications because of their extremely poor resistance to water, organic solvents and weathering.

Another way of lowering the viscosity of these coating resins is to use low viscosity, low molecular weight isocyanate compounds to react with the polyols described hereinabove. This approach, however, leads to potentially serious health problems, since the necessary isocyanate compounds are often volatile and their vapors can cause serious respiratory difficulties and skin irritations. The potential hazards described are especially serious in a coating operation which utilizes spraying and baking equipment capable of producing high concentrations of isocyanate vapors in the working environment.

Present coating manufacturers have adopted the practice of employing high molecular weight isocyanate prepolymers or isocyanate adducts of low molecular weight polyols such as trimethylol propane to react with the high molecular weight polyols to achieve sprayable viscosities. These prepolymers and adducts are formulated at low NCO/OH ratios in order to minimize the presence of free isocyanate compounds which have high vapor pressures. Consequently, these isocyanate prepolymers or adducts are relatively safe to use, but like the polyols, they are viscous liquids or solids at room temperature. Therefore, when the state of the art coating polyols are mixed with these isocyanate prepolymers or adducts, there is only, at best, a slight reduction in the viscosity of the coating. Thus, considerable amounts of solvent must be added to these compositions in order to achieve a sprayable viscosity.

Sprayable coatings with solvent contents of less than 40% can be prepared when low viscosity polyols are used as chain extenders of the isocyanate prepolymers or adducts. Thus, glycols such as ethylene glycol, propylene glycol and their low molecular weight polymers and copolymers could be used to produce sprayable, high solids polyurethane coatings. The resulting coatings however, are brittle and water sensitive, and would not be considered as high performance coatings.

The present invention eliminates these problems and achieves high solids polyurethane coatings having a sprayable viscosity which can be used in a variety of applications such as for coating plastic parts, various metals, wood and even building material substrates such as concrete, brick and cinder block.

Surprisingly, it has now been found that a number of diricinoleate diols have very low viscosities and are either compatible with or rendered compatible by the addition of small amounts of a cosolvent to the commonly used high viscosity polyols. These diricinoleate derivatives allow the viscosity of the overall coating to be reduced to the sprayable range while not detracting from the coating properties available from the high viscosity polyols. Moreover, as opposed to other known viscosity modifiers such as ethylene glycol, 1-4 butanediol and the like, the use of high amounts of a diricinoleate derivative does not cause embrittlement of the resultant coating films but in fact results in an improvement in the impact resistance and flexibility of these films. Thus, the use of these diricinoleate derivatives alone or the substitution of these derivatives for a portion of the high viscosity polyols yields sprayable coating compositions having improved mechanical properties, good solvent resistance, and satisfactory weathering properties. Furthermore, high performance, commercially useful, high solids sprayable polyurethane coatings can be formulated which contain less than as about 30% solvent.

SUMMARY OF THE INVENTION

One object of the invention is to provide low viscosity diricinoleate derivatives which can be reacted with polyisocyanates to form high solids sprayable coating compositions.

The diricinoleate derivative can be prepared from an aliphatic diol of between about 2 and 12 carbon atoms, a cycloaliphatic diol, an aromatic diol, and mixtures thereof. The diricinoleate derivatives of the following compounds have been found to be particularly advantageous for use in these sprayable polyurethane coating compositions: 1, 4 cyclo hexane dimethanol, ethylene glycol, diethylene glycol, ethoxylated bisphenol A, 1, 4 butanediol, 1, 3 propanediol, 1, 6 hexane diol, and 1, 3 neopentyl glycol. These diricinoleate derivatives can also include up to about 50% of a monoricinoleate derivative without departing from the teachings of this invention.

Practically any isocyanate or polyisocyanate compound can be used in these compositions, depending upon the desired properties of the coating.

Another object of the invention is to provide low viscosity polyhydroxyl components from the mixture of a diricinoleate derivative and one or more high viscosity polyols, before reacting this polyhydroxyl component with an isocyanate component to formulate polyurethane compositions which are useful in high solids, sprayable coatings. This coating composition comprises at least one diricinoleate derivative, at least one polyol, and an isocyanate or polyisocyanate compound. In some instances, a small amount of solvent may have to be added to compatibilize these components.

In these compositions, the diricinoleate derivative comprises between 1 and 99 weight percent of the hydroxyl bearing components.

Any prior art polyhydroxy or polyol compounds can be used in these compositions. The particular polyol compound should be selected along with a particular isocyanate compound to obtain the desired properties of the coating.

Another aspect of the invention relates to a method for reducing the viscosity and increasing the solids content of a polyurethane coating composition. This method comprises adding from about 1 to 99 percent by weight of a diricinoleate derivative to the hydroxyl bearing component of polyurethane composition before these components are reacted with an isocyanate or polyisocyanate. It is also possible to prepare these polyurethane coating compositions solely from the diricinoleate derivative and isocyanate compound. The diricinoleate derivatives which are useful in these methods are the same as those described hereinabove.

DESCRIPTION OF THE PREFERRED EMBODIMENTS

In order to utilize the diricinoleate derivatives effectively in high solids sprayable polyurethane coatings, it is necessary to properly choose the isocyanate or polyisocyanate which will be used in conjunction with these derivatives. The selection is based upon consideration of the coating properties desired for the end use application, such as hardness, flexibility, impact resistance, solvent resistance, chemical resistance, and weathering resistance. One skilled in the art should be familiar with such isocyanates and would be capable of making this selection.

Similarly, one skilled in the art should be capable of choosing a particular high viscosity polyol and an isocyanate or polyisocyanate to obtain a particular coating to meet or exceed the minimum acceptance criteria for the application. The performance of these known coatings can be modified and improved by substituting a diricinoleate derivative for a portion of the known polyols. The amount of solvent needed, if any, for each coating to possess a sprayable viscosity can then be easily determined. For the compositions of this invention, it is expected that the solvent content will not exceed about 30 weight percent. Thus, one skilled in the art can formulate an optimum high solids formulation which has a sprayable viscosity and meets the requirements of the end application.

Useful diricinoleate derivatives are those prepared from aliphatic diols ranging in chain length from about 2-12 carbon atoms. These derivatives can be prepared by a variety of synthetic routes familiar to one skilled in the art. It is also possible to prepare useful diricinoleate diols from cyclo aliphatic diols such as 1,4 cyclo hexane dimethanol, as well as from aromatic diols such as phenyl diisopropyl amine, propoxylated and ethoxylated phenols and polyphenols, propoxylated and ethoxylated bisphenol A along with mixtures thereof. Other diricinoleate derivatives may also be prepared from a wide variety of diols which differ in structure from the aliphatic diols described above. These diricinoleate derivatives can be used to formulate high solids coatings in which the derivatives represent between 1-100 percent of the hydroxyl bearing component of the coating.

EXAMPLES

The scope of the invention is further described in connection with the following examples which are set forth for purposes of illustration only and are not to be construed as limiting the scope of the invention in any manner.

The following abbreviations were used in the preparation of the examples in Table I to VI:

| | |
|---|---|
| 1-4 BDDR | 1,4 butane diol diricinoleate |
| 1-4 CHDMDR | 1,4 cyclohexane dimethanol diricinoleate |
| EGDR | ethylene glycol diricinoleate |
| DEGDR | diethylene glycol diricinoleate |
| EGMR | ethylene glycol monoricinoleate |
| EBADR | ethoxylated bisphenol A diricinoleate |

Three different types of polyester polyols were utilized, and these were designated A, B, and D. Component C was an acrylic polyol.

As is shown in the Tables, a number of different combinations and proportions of diricinoleate derivatives and polyols were tested. Tables I and II show that the solids content of the composition increases when higher amounts of the diricinoleate derivative are used as well as that the volatile organic content (VOC) of the composition correspondingly decreases. Tables III and IV illustrate that coating improvements in impact resistance and flexibility are obtained while maintaining acceptable hardness and solvent resistance.

TABLE I

SOLUTION PROPERTIES OF URETHANE SYSTEMS[1]

| Example | Polyols | | Respective (Weights of Polyols) | | Mondur[4] CB-75 Weight | MIBK Weight | Viscosity #2 Zahn Cup (Seconds) | VOC | Total Solids % |
|---|---|---|---|---|---|---|---|---|---|
| 1 | 1-4 BDDR | A[2] | 60 | 20 | 72.73 | 36.5 | 31 | 2.57 | 68.99 |
| 2 | 1-4 BDDR | A | 50 | 30 | 72.16 | 38.5 | 29 | 2.72 | 67.2 |
| 3 | 1-4 BDDR | A | 40 | 40 | 71.60 | 40.5 | 28 | 2.87 | 65.41 |
| 4 | 1-4 BDDR | — | 80 | — | 73.87 | 31 | 29 | 2.23 | 73.2 |
| 5 | — | A | — | 80 | 70.81 | 48 | 30 | 3.42 | 58.9 |
| 6 | 1-4 BDDR | B[2] | 60 | 20 | 105.34 | 51 | 28 | 2.73 | 67.2 |
| 7 | 1-4 BDDR | B | 25 | 25 | 84.83 | 43.88 | 31 | 3.13 | 63.5 |
| 8 | — | B | — | 40 | 97.50 | 53.68 | 34 | 3.55 | 59.1 |
| 9 | 1-4 BDDR | C[3] | 60 | 20 | 61.91 | 36.27 | 30 | 2.78 | 66.4 |
| 10 | 1-4 BDDR | C | 40 | 40 | 50.01 | 40 | 32 | 3.33 | 59.7 |
| 11 | — | C | — | 80 | 26.09 | 47.44 | 34 | 4.59 | 44.9 |
| 12 | 1-4 BDDR | D[2] | 60 | 20 | 77.38 | 40.79 | 28 | 2.84 | 66.1 |
| 13 | 1-4 BDDR | D | 40 | 40 | 80.92 | 49.04 | 29 | 3.36 | 60.3 |
| 14 | — | D | — | 80 | 87.93 | 65.52 | 30 | 4.22 | 50.5 |

[1] Each formulation example also contains 0.005 weight percent T-12 catalyst
[2] A, B, D = Polyester Polyols
[3] C = Acrylic Polyol
[4] Ratio of Mondur CB-75/Polyols = 1.05/1

TABLE II

SOLUTION PROPERTIES OF URETHANE SYSTEMS[1]

| Example | Polyols | | Respective Proportions (Weights of Polyols) | | Mondur[3] CB-75 Weight | MIBK Weight | Viscosity #2 Zahn Cup (Seconds) | VOC | Total Solids % |
|---|---|---|---|---|---|---|---|---|---|
| 15 | 1-4 CHDMDR | A[2] | 60 | 20 | 71.49 | 41.8 | 29 | 2.71 | 67.06 |
| 16 | 1-4 CHDMDR | A | 40 | 40 | 71.25 | 44.13 | 30 | 2.96 | 64.20 |
| 17 | 1-4 CHDMDR | — | 80 | — | 71.73 | 37 | 30 | 2.41 | 70.90 |
| 18 | EGDR | A | 60 | 20 | 74.64 | 39.01 | 35 | 2.65 | 68.15 |
| 19 | EGDR | A | 40 | 40 | 73.83 | 42.14 | 27 | 2.91 | 64.61 |
| 20 | EGDR | — | 80 | — | 76.37 | 36.86 | 27 | 2.41 | 71.05 |
| 21 | DEGDR | A | 60 | 20 | 74.14 | 37.88 | 28 | 2.62 | 68.54 |
| 22 | DEGDR | A | 40 | 40 | 72.5 | 41.45 | 29 | 2.90 | 65.16 |
| 23 | DEGDR | — | 80 | — | 75.74 | 34.35 | 29 | 2.34 | 71.79 |
| 24 | EBADR | A | 60 | 20 | 57.80 | 42.43 | 34 | 2.82 | 66.22 |
| 25 | EBADR | A | 40 | 40 | 61.60 | 44.42 | 28 | 3.03 | 63.54 |
| 26 | EBADR | — | 80 | — | 53.92 | 40.42 | 34 | 2.58 | 69.48 |
| 27 | 1-4 BDDR | EGMR | 30 | 30 | 76.07 | 32.18 | 32 | 256 | 69.57 |

[1] Each formulation example also contains 0.005 weight percent T-12 catalyst.
[2] A = Polyester Polyol
[3] Ratio of Mondur CB-75/polyols = 1.05/1

TABLE III

PHYSICAL PROPERTIES OF URETHANE SYSTEMS[1]

| Example | Polyols | | Respective (Weights of Polyols) | | Pencil Hardness | Impact Resistance in/lb | | ⅛ inch" Mandrell | Double Rubs | |
|---|---|---|---|---|---|---|---|---|---|---|
| | | | | | | Direct | Reverse | | MEK | Xylene |
| 1 | 1-4 BDDR | A | 60 | 20 | F | 164 | 160 | pass | 50 | 100+ |
| 2 | 1-4 BDDR | A | 50 | 30 | H | 124 | 104 | pass | 65 | 100+ |
| 3 | 1-4 BDDR | A | 40 | 40 | 2H | 112 | 94 | pass | 75 | 100+ |
| 4 | 1-4 BDDR | — | 80 | — | 3B | 172 | 172 | pass | 45 | 100+ |
| 5 | — | A | — | 80 | 3H | 44 | 8 | fail | 100+ | 100+ |
| 6 | 1-4 BDDR | B | 60 | 20 | H | 172 | 164 | pass | 85 | 100+ |
| 7 | 1-4 BDDR | B | 25 | 25 | 2H | 172 | 144 | pass | 100+ | 100+ |
| 8 | — | B | — | 40 | 4H | 24 | 20 | fail | 100+ | 100+ |
| 9 | 1-4 BDDR | C | 60 | 20 | HB | 168 | 136 | pass | 60 | 100+ |
| 10 | 1-4 BDDR | C | 40 | 40 | 3H | 164 | 132 | pass | 64 | 100+ |
| 11 | — | C | — | 80 | 7H | 20 | 4 | fail | 100+ | 100+ |
| 12 | 1-4 BDDR | D | 60 | 20 | 2H | 172 | 148 | pass | 50 | 100+ |
| 13 | 1-4 BDDR | D | 40 | 40 | 5H | 60 | 16 | pass | 60 | 100+ |
| 14 | — | D | — | 80 | 6H | 36 | 8 | fail | 100+ | 100+ |

[1] The physical properties were determined after curing for 168 hours at R.T.

TABLE IV

PHYSICAL PROPERTIES OF URETHANE SYSTEMS[1]

| Example | Polyols | | Respective (Weights of Polyols) | | Pencil Hardness | Impact Resistance in/lb | | ⅛ inch Mandrell | Double Rubs | |
|---|---|---|---|---|---|---|---|---|---|---|
| | | | | | | Direct | Reverse | | MEK | Xylene |
| 15 | 1-4 CHDMDR | A | 60 | 20 | 2H | 172 | 164 | pass | 100+ | 100+ |
| 16 | 1-4 CHDMDR | A | 40 | 40 | 3H | 172 | 156 | pass | 100+ | 100+ |

TABLE IV-continued

| | | | | | Pencil | Impact Resistance in/lb | | ⅛ inch | Double Rubs | |
|---|---|---|---|---|---|---|---|---|---|---|
| Example | Polyols | | Respective (Weights of Polyols) | | Hardness | Direct | Reverse | Mandrell | MEK | Xylene |
| 17 | 1-4 CHDMDR | — | 80 | — | HB | 172 | 172 | pass | 100+ | 100+ |
| 18 | EGDR | A | 60 | 20 | F | 172 | 140 | pass | 50 | 100+ |
| 19 | EGDR | A | 40 | 40 | 2H | 160 | 140 | pass | 100+ | 100+ |
| 20 | EGDR | — | 80 | — | B | 160 | 144 | pass | 40 | 100+ |
| 21 | DEGDR | A | 60 | 20 | H | 160 | 136 | pass | 40 | 100+ |
| 22 | DEGDR | A | 40 | 40 | 3H | 160 | 112 | pass | 45 | 100+ |
| 23 | DEGDR | — | 80 | — | B | 164 | 144 | pass | 50 | 100+ |
| 24 | EBADR | A | 60 | 20 | 5H | 172 | 160 | pass | 31 | 100+ |
| 25 | EBADR | A | 40 | 40 | 4H | 172 | 132 | pass | 60 | 100+ |
| 26 | EBADR | — | 80 | — | HB | 164 | 152 | pass | 50 | 100+ |
| 27 | 1-4 BDDR | EGMR | 30 | 30 | 2H | 172 | 140 | pass | 75 | 100+ |

[1]The physical properties were determined after curing for 168 hours at R.T.

Table IV (Example 27) illustrates that mixtures of up to about 50% of the mono and diricinoleates can be used as low viscosity polyols to obtain increased film hardness. However, these polyols produce higher VOC's than the diricinoleates and lower equivalent weights. The lower equivalent weights results in coatings with higher isocyanate contents which generally will increase the cost of the coatings. However, the experienced formulator can best judge the desirability of using blends of mono and diricinoleates.

These blends can be obtained by simply admixing the mono and diricinoleates or by synthesizing the blend by means well known to those skilled in the art.

While it is apparent that the invention herein disclosed is well calculated to fullfill the objects above stated, it will be appreciated that numerous modifications and embodiments may be devised by those skilled in the art, and it is intended that the appended claims cover all such modifications and embodiments as fall within the true spirit and scope of the present invention.

Having thus described our invention, what we claim as new and desire to secure by Letters Patent is:

1. A low viscosity sprayable polyurethane coating composition comprising at least one diricinoleate diol and a polyisocyanate compound; said diricinoleate diol and said polyisocyanate compound being present in substantially stoichiometric amounts.

2. The composition according to claim 1 wherein said diricinoleate diol is a diricinoleate of an aliphatic diol of between about 2 and 12 carbon atoms, a cycloaliphatic diol, an aromatic diol, or mixtures thereof.

3. The composition according to claim 2 wherein said diricinoleate diol is a diricinoleate of 1,4 cyclo hexane dimethanol, ethylene glycol, diethylene glycol, ethoxylated bisphenol A, 1, 4 butanediol, 1, 3 propanediol, 1, 6 hexane diol, or 1, 3 neopentyl glycol.

4. The composition according to claim 3 wherein said diricinoleate diol further comprises up to about 50% of a monoricinoleate derivative.

5. A low viscosity sprayable polyurethane coating composition comprising a hydroxyl bearing component comprising at least one diricinoleate diol and at least one polyol; and a polyisocyanate component; said hydroxyl bearing component and said polyisocyanate component being present in substantially stoichiometric amounts.

6. The composition according to claim 5 wherein said diricinoleate diol comprises between 1 and 99 weight percent of the hydroxyl bearing component of the composition and said at least one polyol comprises between 99 and 1 weight percent of the hydroxyl bearing component of the composition.

7. The composition according to claim 6 wherein said diricinoleate diol is a diricinoleate of an aliphatic diol of between about 2 and 12 carbon atoms, a cycloaliphatic diol, an aromatic diol or mixtures thereof.

8. The composition according to claim 7 wherein said diricinoleate diol is a diricinoleate of 1,4 cyclo hexane dimethanol, ethylene glycol, diethylene glycol, ethoxylated bisphenol A, 1,4 butanediol, 1,3 propanediol, 1,6 hexane diol, or 1,3 neopentyl glycol.

9. The composition according to claim 8 wherein said diricinoleate diol further comprises up to about 50% of a monoricinoleate derivative.

10. The composition according to claim 9 further comprising a small amount of solvent.

11. A method for reducing the viscosity and increasing the solids content of a polyurethane coating composition which comprises adding to the hydroxyl bearing component of a polyurethane composition from about 1 to 99 percent by weight of a diricinoleate diol before said components are reacted with a substantially stoichiometric amount of a polyisocyanate compound.

12. The method according to claim 11 wherein said diricinoleate diol is a diricinoleate of an aliphatic diol of between about 2 and 12 carbon atoms, a cycloaliphatic diol, an aromatic diol, or mixtures thereof.

13. The method according to claim 12 wherein said diricinoleate diol is a diricinoleate of 1,4 cyclo hexane dimethanol, ethylene glycol, diethylene glycol, ethoxylated bisphenol A, 1,4 butanediol, 1,3 propanediol, 1,6 hexane diol, or 1,3 neopentyl glycol.

14. The method according to claim 13 wherein said diricinoleate diol further comprises up to about 50% of a monoricinoleate derivative.

15. The method according to claim 14 wherein said polyurethane composition further comprises a small amount of solvent.

16. A method for preparing a polyurethane coating composition having a low viscosity suitable for spray coating applications which comprises reacting at least one diricinoleate diol with a substantially stoichiometric amount of a polyisocyanate compound.

17. The method according to claim 16 wherein said diricinoleate diol is a diricinoleate of an aliphatic diol of between about 2 and 12 carbon atoms, a cycloaliphatic diol, an aromatic diol, or mixtures thereof.

18. The method according to claim 17 wherein said diricinoleate diol is a diricinoleate of 1,4 cyclohexane dimethanol, ethylene glycol, diethylene glycol, ethoxylated bisphenol A, 1,4 butanediol, 1,3 propanediol, 1,6 hexane diol, or 1,3 neopentyl glycol.

19. The method according to claim 18 wherein said diricinoleate diol further comprises up to about 50% of a monoricinoleate derivative.

20. A low viscosity sprayable polyurethane coating composition comprising at least one diricinoleate of an aliphatic diol of between about 2 and 12 carbon atoms, a cycloaliphatic diol, an aromatic diol, or mixtures thereof, and a polyisocyanate compound; said diricinoleate and said polyisocyanate and being present in amounts such that the ratio of the polyisocyanate to the diricinoleate is about 1.05 to 1.

21. A low viscosity sprayable polyurethane coating composition comprising a hydroxyl bearing component comprising at least one diricinoleate of an aliphatic diol of between about 2 and 12 carbon atoms, a cycloaliphatic diol, an aromatic diol, and mixtures therefore, and at least one polyol; and a polyisocyanate compound; said diricinoleate diol comprising between 1 and 99 weight percent of the hydroxyl bearing component of the composition, and said at least one polyol comprising between 99 and 1 weight percent of the hydroxyl bearing component of the composition; said hydroxyl bearing component and said polyisocyanate compound being present in amounts such that the ratio of polyisocyanate to the hydroxyl bearing component is about 1.05/1.

22. A method for reducing the viscosity and increasing the solids content of a polyurethane coating composition which comprises adding to the hydroxyl bearing component of a polyurethane composition from about 1 to 99 percent by weight of a diricinoleate of an aliphatic diol of between about 2 and 12 carbon atoms, a cycloaliphatic diol, an aromatic diol, or mixtures thereof, before said hydroxyl bearing component is reacted with a slight excess of a polyisocyanate compound such that the ratio of polyisocyanate to diricinoleate is about 1.05/1 to form the polyurethane composition.

23. A method for preparing a polyurethane coating composition having a low viscosity suitable for spray coating applications which comprises reacting at least one diricinoleate of an aliphatic diol of between about 2 and 12 carbon atoms, a cycloaliphatic diol, an aromatic diol, or mixtures thereof, with a slight excess of a polyisocyanate compound; such that the ratio of polyisocyanate to diricinoleate is about 1.05/1.

* * * * *